United States Patent [19]

Ootsuka et al.

[11] Patent Number: 4,567,755
[45] Date of Patent: Feb. 4, 1986

[54] IGNITION/MISFIRE DETECTOR FOR AN INTERNAL COMBUSTION ENGINE

[75] Inventors: Yoshinori Ootsuka; Tadashi Hattori; Minoru Yamamoto, all of Okazaki; Tadashi Ozaki, Gamagori, all of Japan

[73] Assignees: Nippon Soken, Inc., Nishio; Nippondenso Co., Ltd., Kariya, both of Japan

[21] Appl. No.: 584,383

[22] Filed: Feb. 28, 1984

[30] Foreign Application Priority Data

Mar. 3, 1983 [JP] Japan .................................. 58-33760
Mar. 26, 1983 [JP] Japan .................................. 58-49688

[51] Int. Cl.⁴ .......................................... G01M 15/00
[52] U.S. Cl. .................................................. 73/117.3
[58] Field of Search .................. 73/119 A, 117.3, 115; 364/551

[56] References Cited

U.S. PATENT DOCUMENTS 4,403,505 9/1983 Hattori et al. .................... 73/115 X
4,503,505 3/1985 Damson et al. ............... 73/117.3 X Primary Examiner—Jerry W. Myracle
Attorney, Agent, or Firm—Cushman, Darby & Cushman

[57] ABSTRACT

A device for the detection of ignition misfire in an internal combustion engine is disclosed. A pressure detector detects changes in the combustion pressure of the engine, and a timing detector calculates a reference angular position of the engine. An ignition/misfire detection unit detects occurrences of ignition/misfire. The detection unit compares the output of the pressure detector with predetermined positive and negative reference voltages, and produces signals when these thresholds are passed. The period of a signal produced from the point of positive value detection to the negative value detection is counted and another period which is double the period from the generation of the positive value to the signal from the timing detector unit is counted. These two signals are then compared against one another, using a predetermined program, to detect if ignition or misfire has occurred in the internal combustion engine. A sample and hold circuit may also delay the value obtained by the pressure detector, if necessary.

6 Claims, 23 Drawing Figures

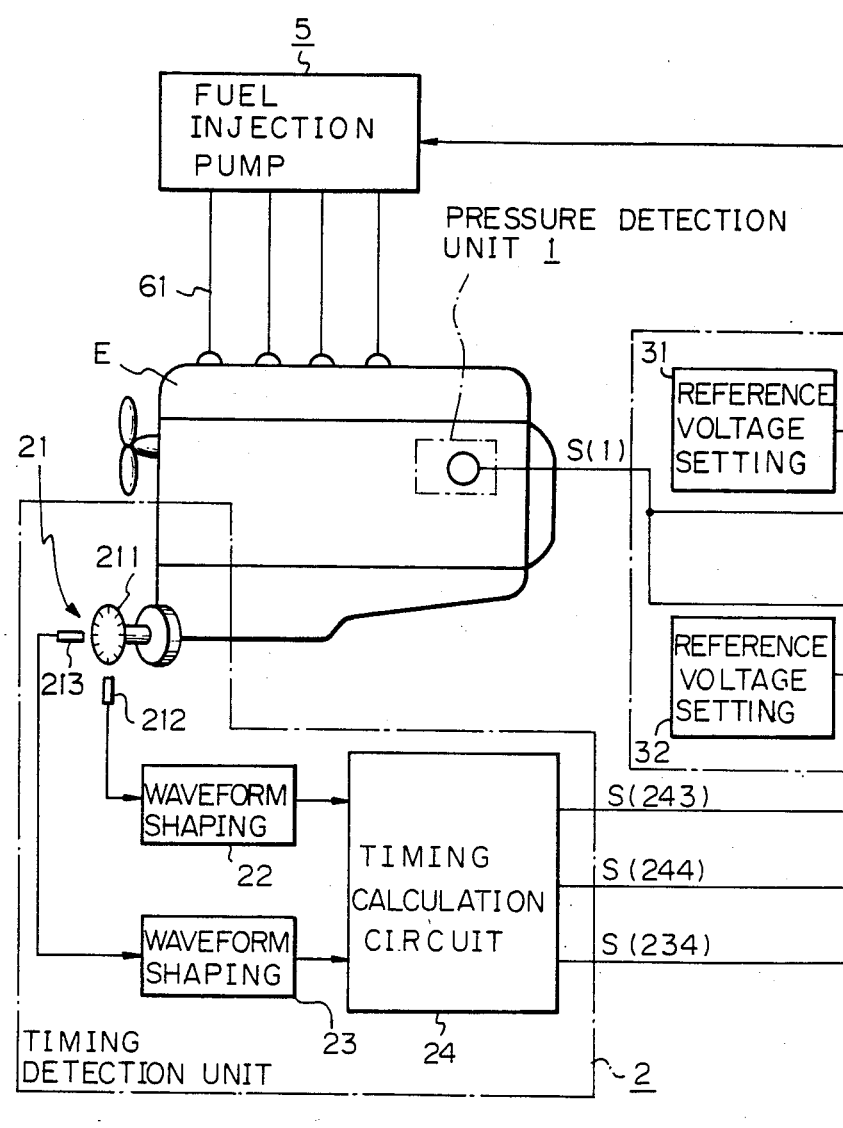
Fig. IA

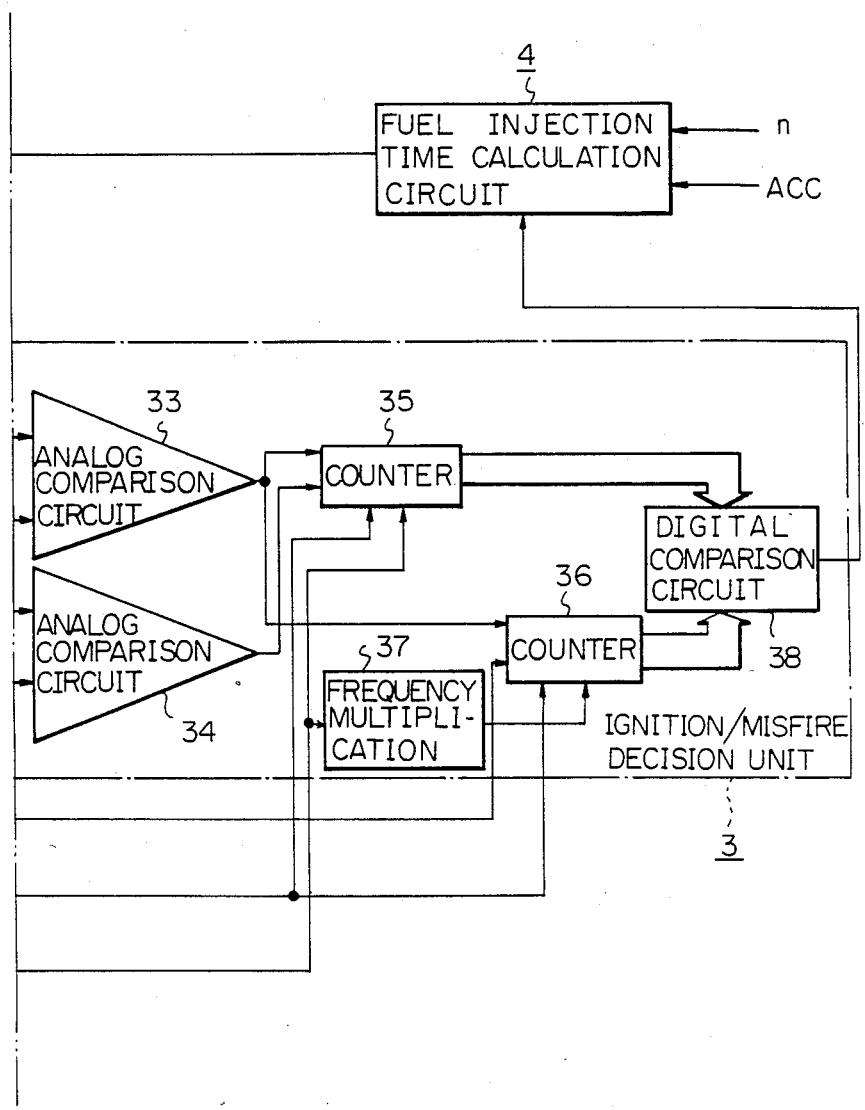
Fig. IB

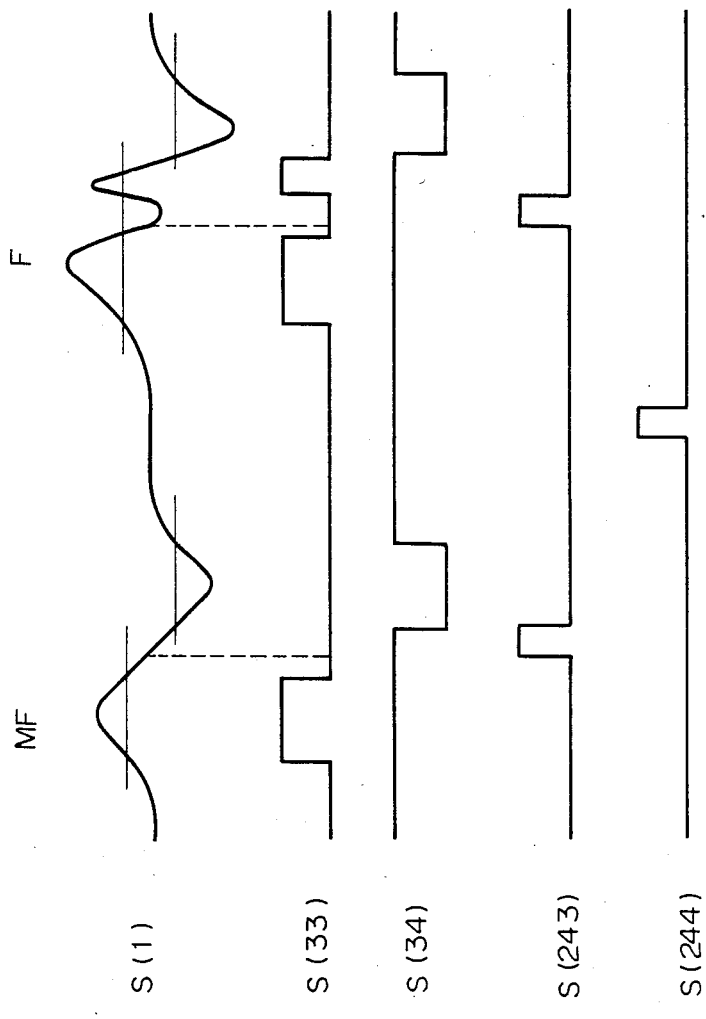

| Fig. 8A | Fig. 8B |

IGNITION/MISFIRE DETECTOR FOR AN INTERNAL COMBUSTION ENGINE

BACKGROUND OF THE INVENTION

1. Field of the Invention

The present invention relates to a device for the detection of ignition/misfire in an internal combustion engine for use in an automotive vehicle. This ignition/misfire detection is beneficial in that it detects the boundary between ignition and misfire, i.e., ignition limits, thereby enabling the operation of an engine at an optimum condition.

2. Description of the Prior Art

If a method could be found for detecting the ignition limits of an engine, it would enable control of the air-fuel ratio, the EGR, or the ignition timing of an engine to be much improved. For example, if the air-fuel mixture in an engine can be controlled to realize a so-called ideal air-fuel ratio, i.e., the air-fuel ratio at which complete combustion occurs just prior to misfire, and there is an increase in the exhaust hydrocarbon HC, the concentration of harmful constituents such as carbon monoxide CO and hydrocarbon HC will be minimized, and the concentration of nitrogen oxides $NO_x$ will become less than that occurring when the engine is running in the vicinity of the stoichiometrical air-fuel ratio. The realization of this so-called ideal air-fuel ratio would be extremely advantageous from the viewpoint of counteracting undesirable exhaust emissions, and, from an economical viewpoint, will bring the advantage of a minimum specific fuel consumption.

It is for the above reasons that a suitable method has been sought of detecting the ignition limits of an engine. However, as yet a practical, precise, and reliable method for detecting these ignition limits has not been found.

SUMMARY OF THE INVENTION

The object of the present invention is to provide an improved device for the detection of ignition/misfire in an engine by which the detection of the ignition limits is achieved in a practical and precise manner with the use of a relatively simple structure of the devices.

Therefore, in accordance with the present invention, there is provided a device for the detection of ignition/misfire in an engine which includes a pressure detection unit for detecting changes in the combustion pressure in the engine, a timing detection unit for calculating a reference angular position of the rotation of the engine, and an ignition/misfire decision unit for deciding the occurrence of ignition or misfire of the engine. The ignition/misfire decision unit includes a positive value comparison unit for comparing the output of the pressure detection unit with a predetermined positive reference voltage; a negative value comparison unit for comparing the output of the pressure detection unit with a predetermined negative reference voltage; a first counting unit for measuring the period from the generation of the output of the positive value comparison unit to the generation of the output of the negative value comparison unit; a second counting unit for measuring the period which is twice the period from the generation of the output of the positive value comparison unit to the generation of an output reference signal from the timing detection unit; and a comparison unit for comparing the output of the first counting unit and the output of the second counting unit.

Alternatively, the ignition/misfire detection unit may include a sample and hold unit for sampling and holding the output of the pressure detection unit at a predetermined timing of the crankshaft angle according to the output of the timing detection unit, an inversion unit for inverting the output of the sample and hold unit with respect to a reference value, a first comparison unit for comparing the output of the pressure detection unit with the output of the inversion unit, a counting unit for starting counting at a predetermined timing of the crankshaft angle obtained from the timing detection unit and terminating counting at the generation of the output of the first comparison unit, a constant value settling unit for settling the output value corresponding to misfire of the engine, and a second comparison unit for comparing the output of the counting unit with the output of the constant value settling unit.

BRIEF DESCRIPTION OF THE DRAWINGS

In the drawings, FIG. 1 (including FIGS. 1A and 1B) is a schematic diagram of a device for the detection of ignition/misfire in an internal combustion engine according to a representative embodiment of the present invention;

FIG. 7 illustrates the waveforms of the signals in the device shown in FIG. 1;

DESCRIPTION OF THE PREFERRED EMBODIMENTS

Figure 2:
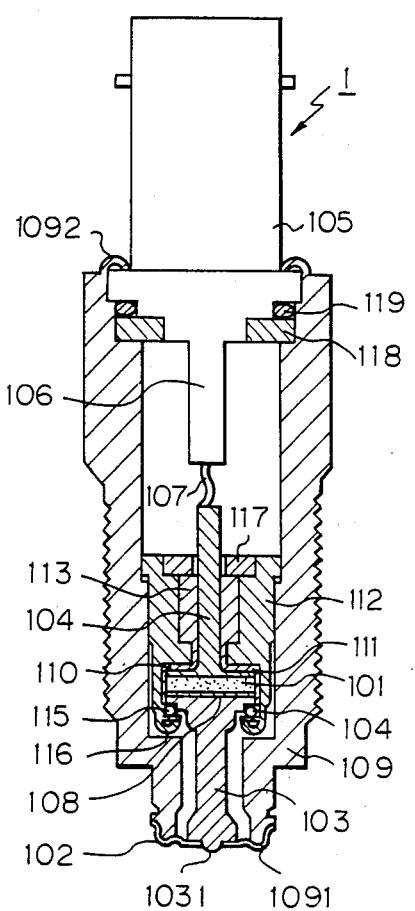
FIG. 2 illustrates the structure of the pressure detection unit used in the device shown in FIG. 1.
Figure 3:
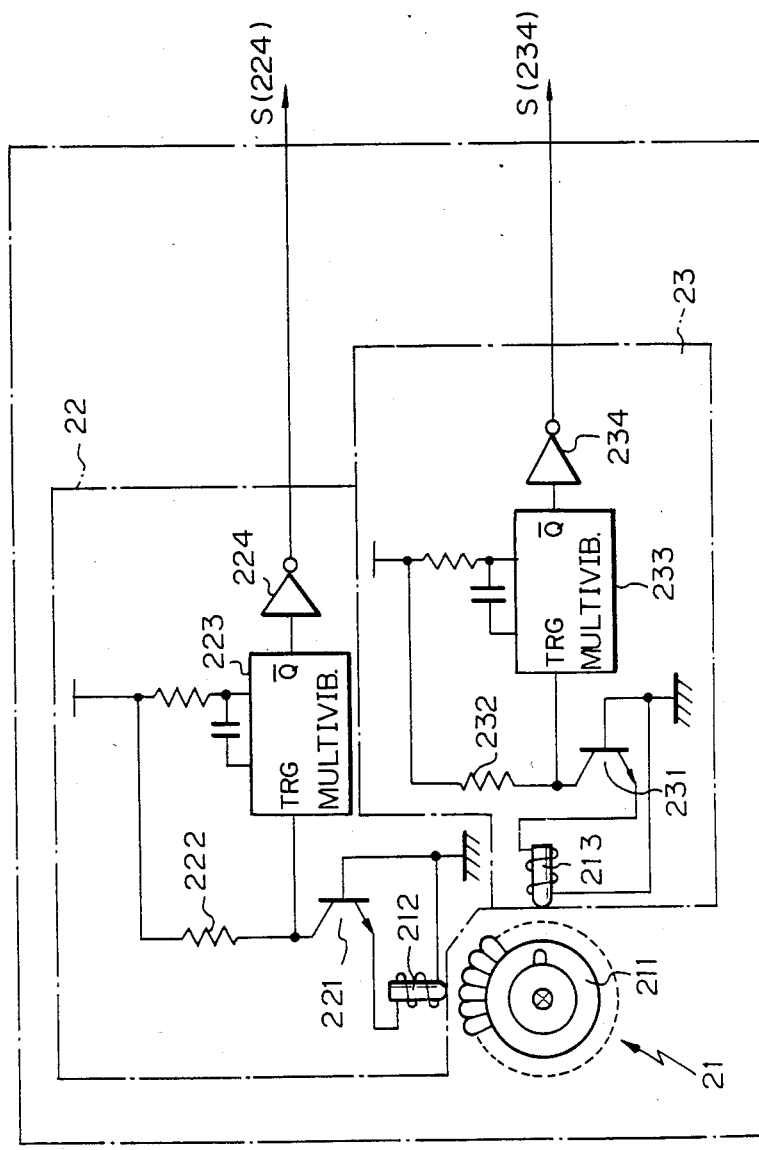
FIGS. 3 and 4 illustrate the structures of the timing detection unit used in the device shown in FIG. 1.
Figure 4:
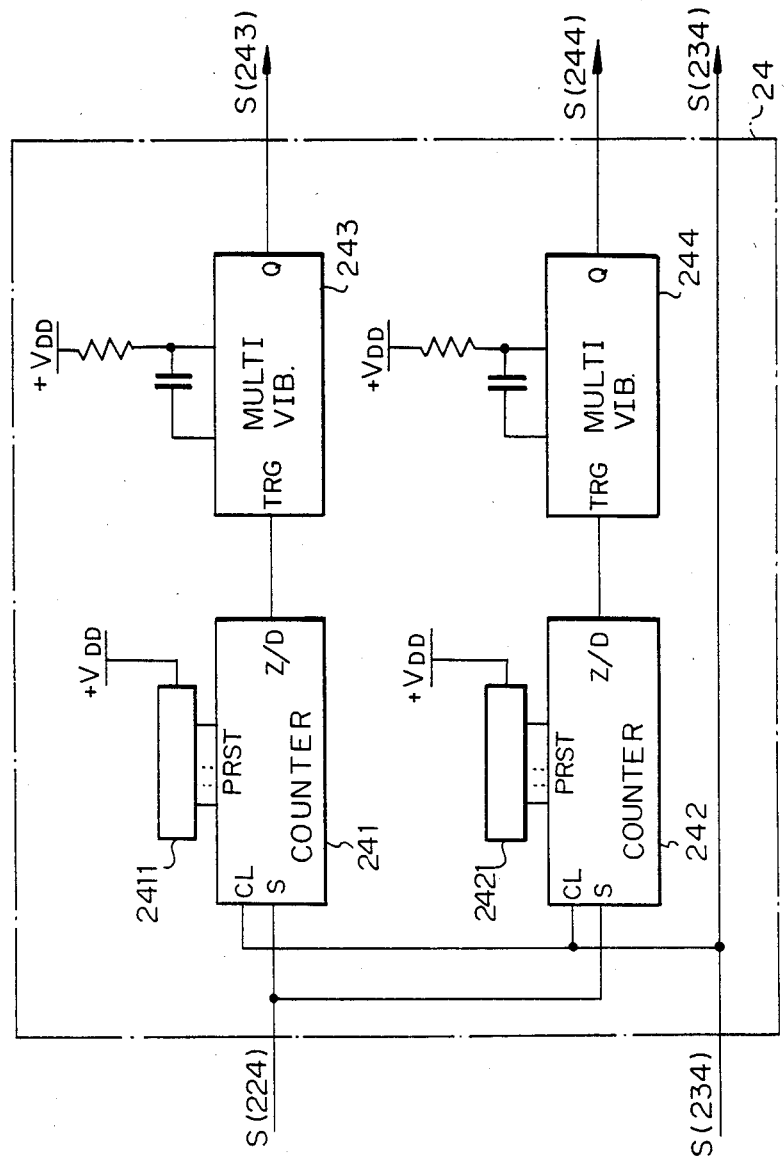
Figure 5A:
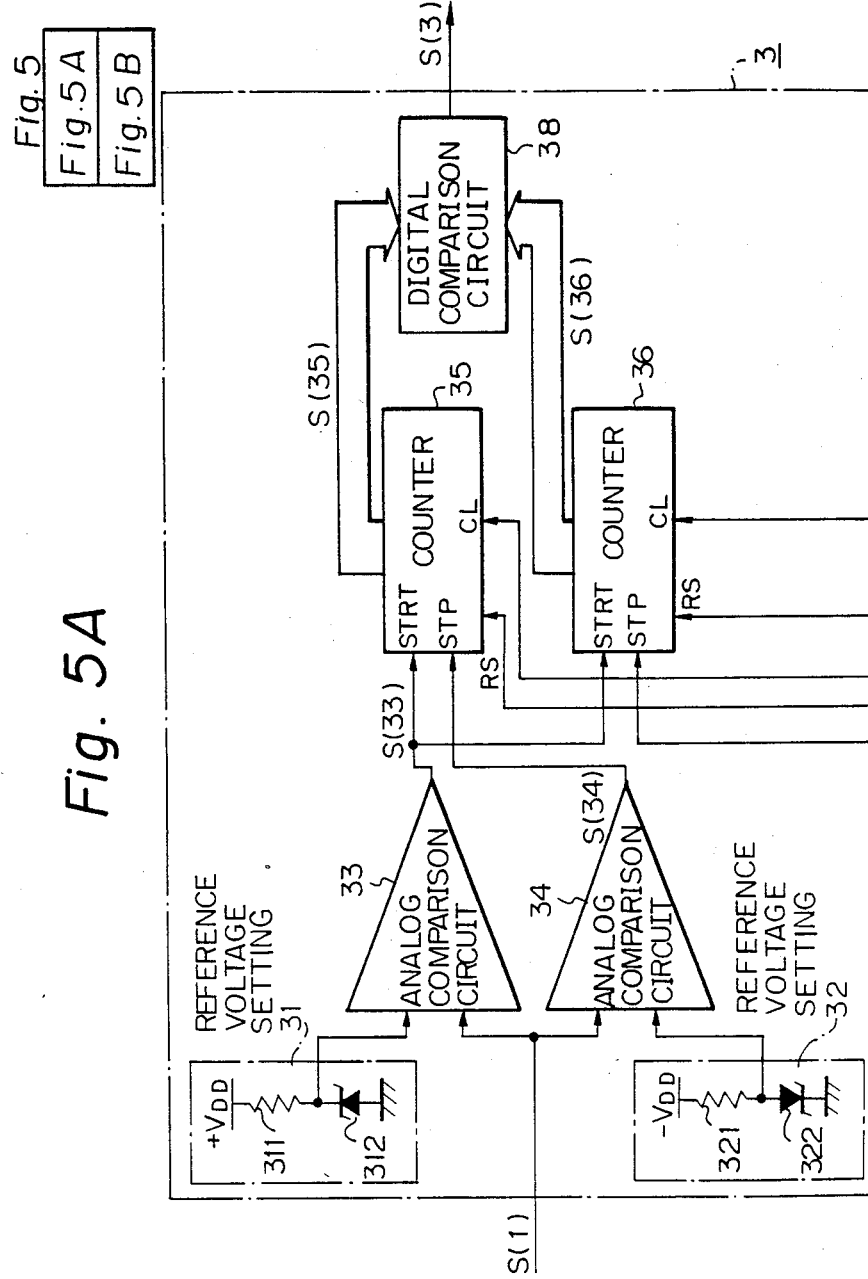
FIG. 5 (including FIGS. 5A and 5B) illustrates the structure of the ignition/misfire decision unit used in the device shown in FIG. 1.
Figure 5B:
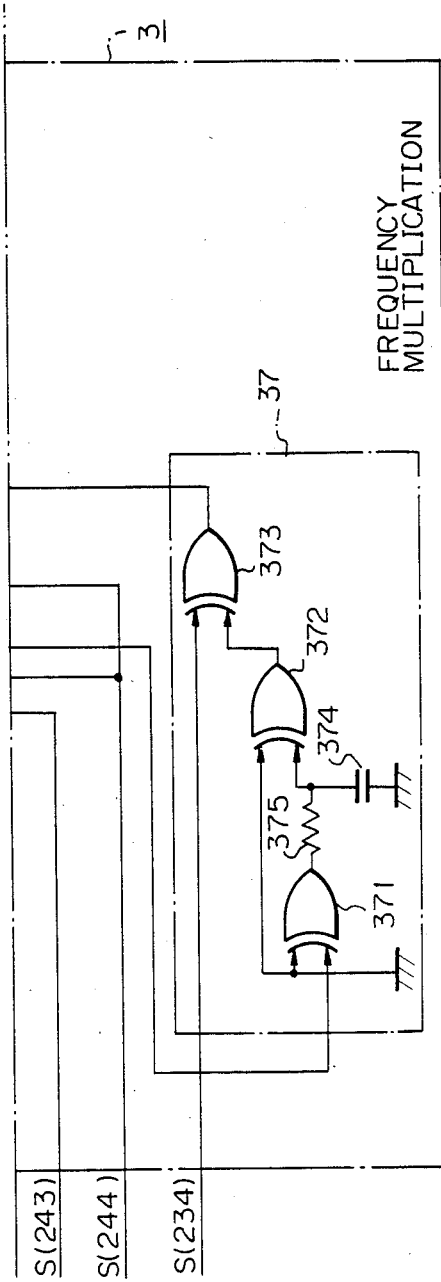

A device for the detection of ignition/misfire in an engine according to an embodiment of the present invention is illustrated in FIG. 1. The structure of the pressure detection unit used in the device shown in FIG. 1 is illustrated in FIG. 2; the structure of the timing detection unit is illustrated in FIGS. 3 and 4; and the structure of the ignition/misfire decision unit is illustrated in FIG. 5.

The device shown in FIG. 1 includes an in-line four cylinder diesel engine E, a piezoelectric type pressure detection unit 1 for detecting changes in the combustion pressure, a timing detection unit 2, an ignition/misfire decision unit 3, a circuit 4 for calculating fuel injection time, and a fuel injection pump 5.

The timing detection unit 2 includes a reference and angular signal generation device 21, a waveform shaping circuit 22 for the angular signal, a waveform shaping circuit 23 for the reference signal, and a timing calculation circuit 24.

The ignition/misfire decision unit 3 includes a positive reference voltage setting circuit 31, a negative reference voltage setting circuit 32, a first analog comparison circuit 33, a second analog comparison circuit 34, a first counting circuit 35, a second counting circuit 36, a frequency multiplication (doubling) circuit 37, and a digital comparison circuit 38. The fuel injection pump 5 is connected to fuel injection nozzles 61, 62, 63, and 64.

In the pressure detector 1 shown in FIG. 2, a pressure receiving column 103, as a pressure transmission body, is provided between a piezoelectric element 101 and a diaphragm 102. An output electrode 104 is connected to a terminal 106 of a connector 105 via a lead wire 107. A ground electrode 108 is connected to a housing 109 via the pressure receiving column 103 and the diaphragm 102. Insulators 110 and 111 insulate the piezoelectric element 101 from a sensor body 112. An insulator 113 insulates the output electrode 104 from the sensor body 112.

The process of the construction of the sensor assembly is as follows. First, the insulator 110, the output electrode 104, the piezoelectric element 101, the pressure receiving column 103, and the insulator 111 are introduced into the sensor body 112 through the lower opening in the body. Then, the clamping portion 116 of the sensor body 112 is pressed over the peripheral edge of the pressure receiving column 103 so that the piezoelectric element 101 and the pressure receiving column 103 are fixed to the sensor body 112. The insulator 113 is then introduced through the upper opening of the sensor body 112, and a spacer 117 is fitted to the insulator 113, thus completing the construction of the sensor assembly. Pressure is exerted on the piezoelectric element 101 by a resilient metal ring 114.

The sensor assembly is pressed into the housing 109, and the diaphragm 102 is welded to the end 1031 of the pressure receiving column 103 and the end 1091 of the housing 109.

The clamping portion 1092 of the housing 109 is pressed against the connector 105, which rests on a spacer 118 and an O-ring 119, so that the connector 105 is fixed to the housing 109.

The thus constructed pressure detector 1 produces the signal S(1) representing the change of pressure per time (dP)/(dt), due to the characteristic of the piezoelectric element 101 in the pressure detector 1.

As illustrated in FIG. 3, the reference and angular signal generation device 21 includes a combination 211 of a rotor having plural projections along the circumference thereof and a rotor having a single projection along the circumference thereof, and electromagnetic pickups 212 and 213 arranged opposite to the above-described projections. The combination 211 of the rotors is rotated once every two rotations of the crankshaft of the engine.

The signals from the electromagnetic pickups 212 and 213 are supplied to transistors 221 and 231. The transistors 221 and 231 are connected to one-shot multivibrators 223 and 233. The outputs of the multivibrators 223 and 233 are supplied to drivers 224 and 234. The trigger input terminals of the one-shot multivibrators 223 and 233 are connected to the collectors of the transistors 221 and 231.

When a projection of the rotating combination 211 of the rotors passes by each of the electromagnetic pick-ups 212 and 213, the output voltage of each of the electromagnetic pick-ups 212 and 213 becomes a negative voltage. At the moment that the output voltage becomes negative, i.e., falls, the transistors 221 and 231 become conductive. At the moment that the transistors 221 and 231 become conductive, the one-shot multivibrators 223 and 233 are triggered. Output signals having a LOW potential during the period determined by the time constant given by the resistor and the capacitor connected to the one-shot multivibrators 223 and 233. The produced signals are supplied to the inversion drivers 224 and 234, and converted to the output signals of the inversion drivers 224 and 234, having a HIGH potential.

Thus, the waveform shaping circuit 22 of the angular signal produces a signal S(224) having a frequency proportional to the rotation rate of the engine, and a pulse width independent from the rotation rate of the engine, while the waveform shaping circuit 23 of the reference signal produces one pulse signal S(234) every rotation of the engine.

As illustrated in FIG. 4, the timing calculation circuit 24 includes preselected input down counters 241 and 242, and one-shot multivibrators 243 and 244. The down-counting from the preselected value is carried out in the down-counters 241 and 242, using the output of the angular signal waveform shaping circuit 22 as clock signals. When the count reaches zero, the potential of the output signal at the Z/D terminal rises. Due to the raised potential of the output signal at the Z/D terminal, the one-shot multivibrators 243 and 244 are triggered to produce the output pulses. The timing of the output signal S(243) is selected to be top dead center (TDC) of the crankshaft angle.

As illustrated in FIG. 5, the ignition/misfire decision unit 3 includes reference voltage selection circuits 31 and 32, analog comparison circuits 33 and 34, counter circuits 35 and 36, a frequency doubling circuit 37, and a digital comparison circuit 38.

In the device shown in FIG. 1, the processing of the signals is carried out in the ignition/misfire decision unit 3 on the basis of the outputs of the pressure detection unit 1 and the timing detection unit 2, so that the decision concerning ignition/misfire is made.

The optimum fuel injection time is calculated in the fuel injection time calculation circuit 4 on the basis of the output of the ignition/misfire decision unit 3 and other data, such as the rotation rate of the engine, the crankshaft angle, or the like. The fuel injection pump 5 is controlled according to the output of the fuel injection time calculation unit 4.

Figure 6A:
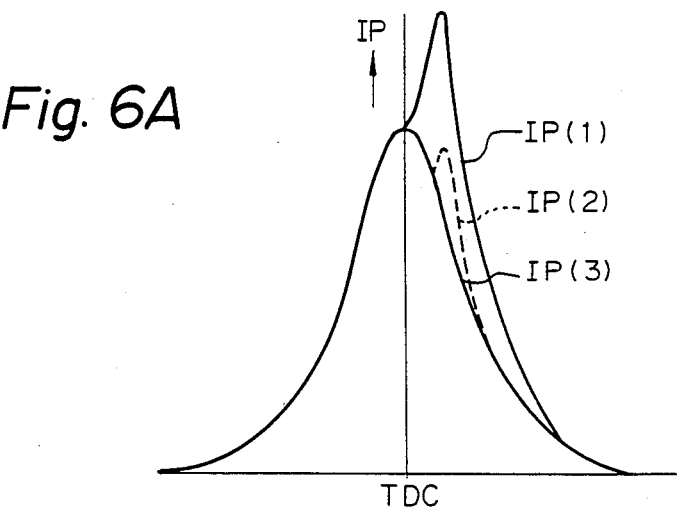
FIGS. 6A and 6B illustrate the principle of the decision concerning ignition/misfire in the device shown in FIG. 1.
Figure 6B:
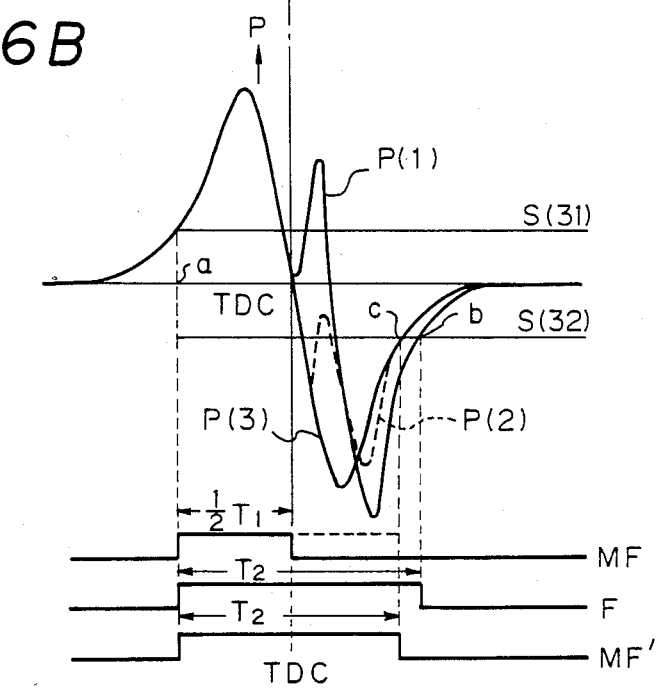

The principle of the decision concerning ignition/misfire in the device shown in FIG. 1 will now be described with reference to FIGS. 6A and 6B. In FIG. 6A, the abscissa represents the time or crankshaft angle, while the ordinate represents the integrated output IP of the pressure detection unit 1. The curve IP(1) represents a complete ignition condition, i.e., an appropriate fuel injection carried out, IP(2) represents a condition just prior to misfire, and IP(3) represents a complete misfire condition. In FIG. 6B, the abscissa corresponds to that in FIG. 6A, while the ordinate represents the output P of the pressure detection unit 1. The curve P(1) represents the complete ignition condition (F), i.e., an appropriate fuel injection carried out, P(2) represents the condition (MF') just prior to misfire, and P(3) represents the complete misfire condition (MF).

When the output of the pressure detection unit 1 is increased until it exceeds the reference voltage S(31), bringing the potential of the output S(33) of the analog comparison circuit 33 to HIGH, the counting of the counting circuits 35 and 36 is started using the angular signals of the timing detection unit 2 as clock signals. At this time, the frequency of the clock input signal for the counting circuit 36 has been doubled, and the counting of the counting circuit 36 is terminated by the output S(243), at TDC, of the timing detection unit 2.

When the output of the pressure detection unit 1 is increased until it exceeds the reference voltage S(32), bringing the potential of the output S(34) of the analog comparison circuit 34 to HIGH, the counting of the counting circuit 35 is terminated.

The outputs of the counting circuits 35 and 36 are then compared in the digital comparator 38, to enable a decision on whether the condition is ignition or misfire. The output S(36) of the counting circuit 36 is the same as the output of the counting circuit when the condition is misfire.

As can be seen in FIGS. 6A and 6B, in the device shown in FIG. 1, the time or the crankshaft angle $T_1$ corresponding to misfire, and the time or crankshaft angle $T_2$ corresponding to ignition or just prior to misfire, are calculated so that the decision for an ignition or misfire condition is obtained.

The potential of the output S(33) of the analog comparison circuit 33 rises according to the comparison between the output S(1) of the pressure detection unit 1 and the positive reference voltage S(31), starting the counting of the counting circuits 35 and 36.

After that, the counting of the counting circuit 36 is terminated at TDC. The obtained count is $\frac{1}{2} T_1$.

The potential of the output S(34) of the analog comparison circuit 34 rises according to the comparison between the output S(1) of the pressure detection unit 1 and the negative reference voltage S(32), terminating the counting of the counting circuits 35. The obtained count is $T_2$.

For a misfire condition, $T_2$ is approximately equal to $T_1$ ($T_2 \approx T_1$), while for an ignition condition, $T_2$ is greater than $T_1$ ($T_2 > T_1$). Thus, the detection of the ignition limits is carried out.

As can be seen in FIG. 6B, the time from point "a" to TDC is $\frac{1}{2} T_1$, and the time from point "a" to point "b" or "c" is $T_2$. For a condition (F) of complete ignition, $T_1$ is smaller than $T_2$ ($T_1 < T_2$), while a condition (MF') just prior to misfire or a condition (MF) of complete misfire, $T_1$ is approximately equal to $T_2$ ($T_1 \approx T_2$).

The waveforms of the signals S(1), S(33), S(34), S(243), and S(244), for a misfire MF and complete ignition F, in the device shown in FIG. 1 are shown in FIG. 7.

Figures 8, 8A:
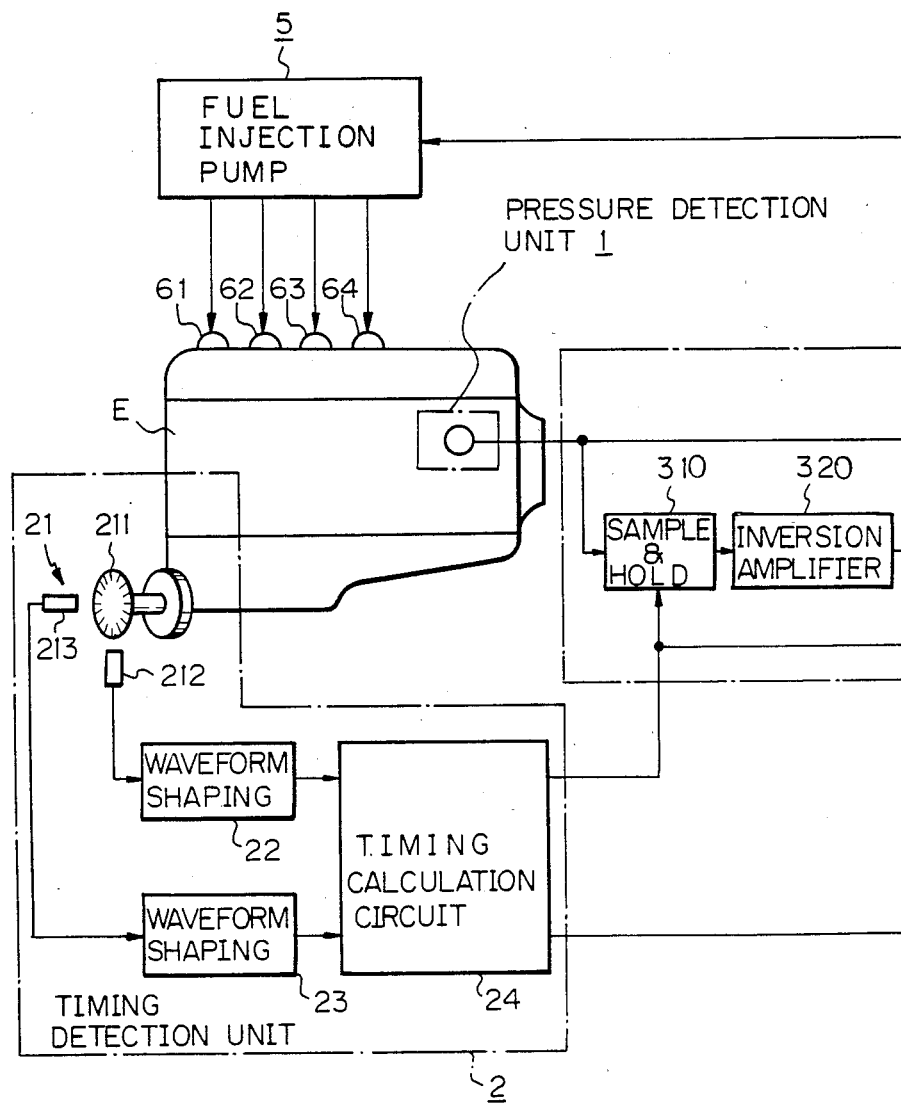
FIG. 8 (includes FIGS. 8A and 8B) illustrates a device for the detection of ignition/misfire in an internal combustion engine according to a modified embodiment of the present invention.
Figure 8B:
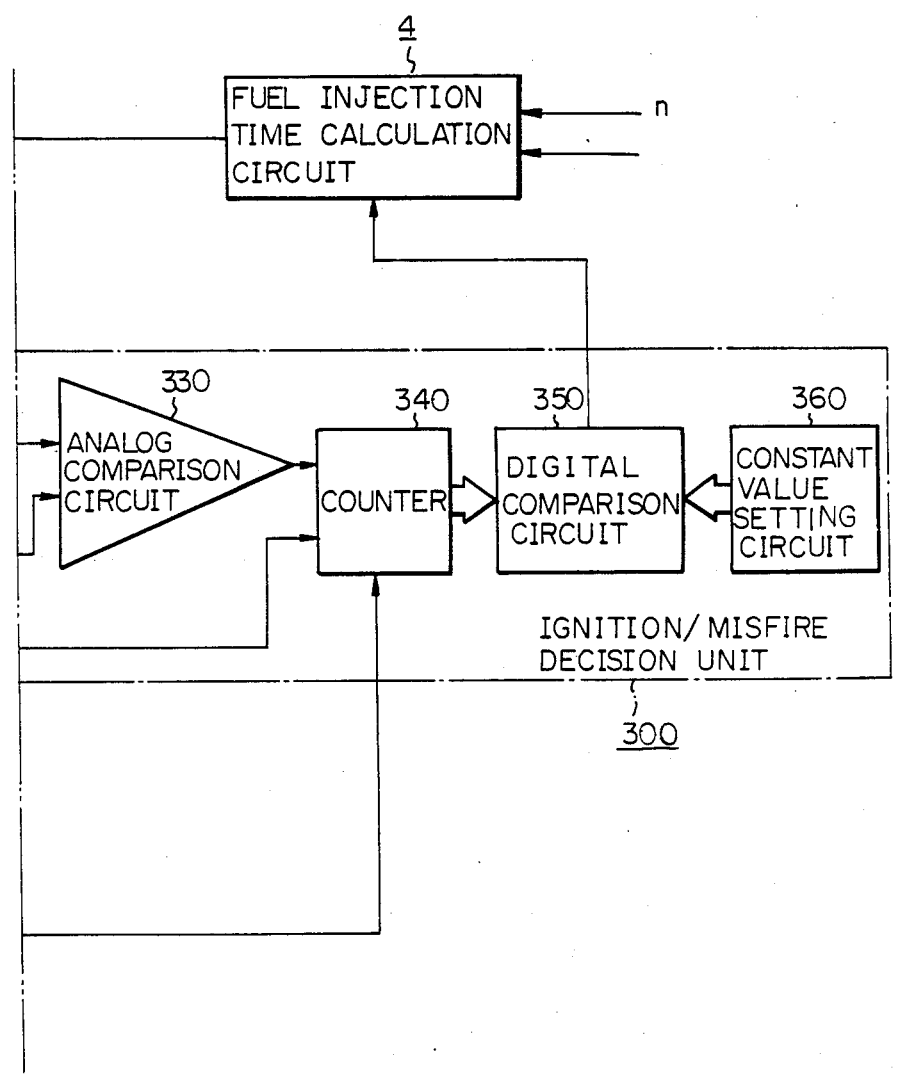

A device for the detection of ignition/misfire in an engine according to a modified embodiment of the present invention is illustrated in FIG. 8. The device shown in FIG. 8 includes an in-line four cylinder diesel engine E, a differential output type pressure detection unit 1 for detecting changes in combustion pressure, a unit 300, a circuit 4 for calculating fuel injection time, and a fuel injection pump 5.

The reference and angular signal generation device 21, the waveform shaping circuit 22 for the angular signal, and the waveform shaping circuit 23 for the reference signal are the same as for the device shown in FIG. 1.

Figure 9:
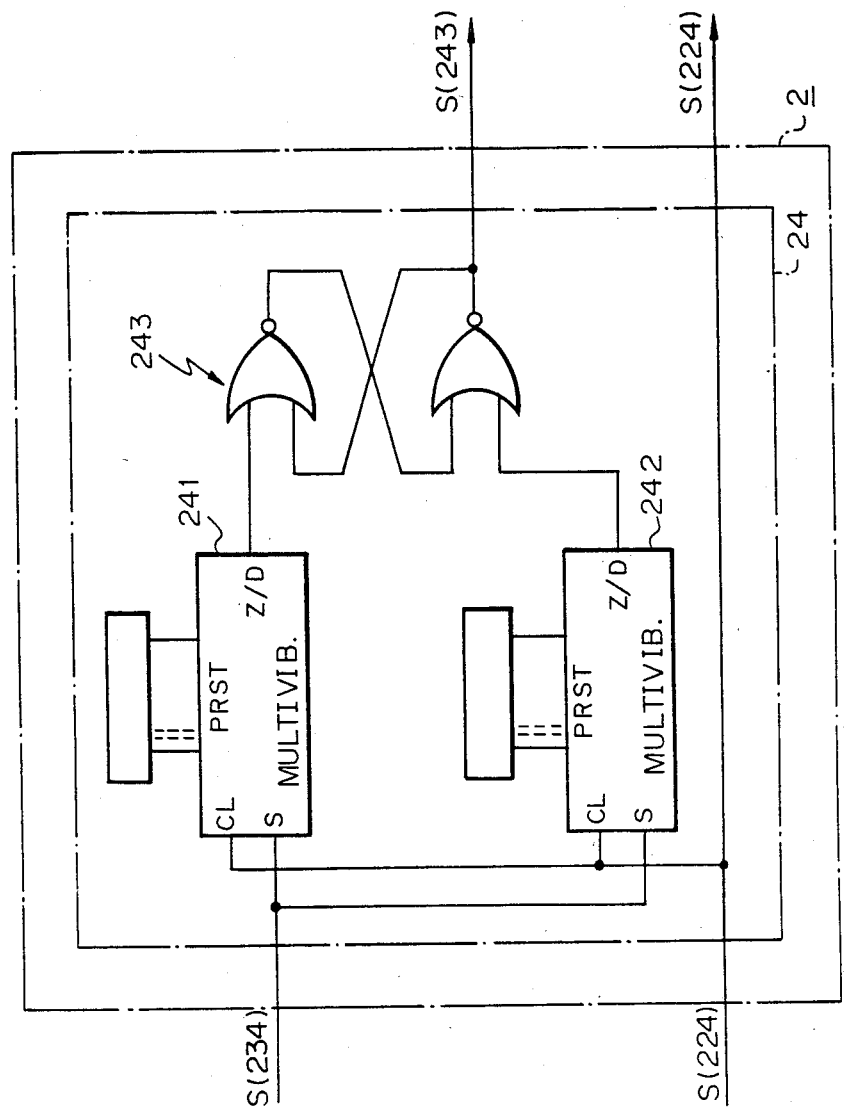
FIG. 9 illustrates the structure of the timing calculation circuit used in the device shown in FIG. 8.

The structure of the timing calculation circuit 24 is illustrated in FIG. 9. The timing calculation circuit 24 includes down-counters 241 and 242 with preselected inputs, and flip-flop circuits 243. The down-counters 241 and 242 carry out down-counting from initial values preselected by the reselected inputs. When the count reaches zero, pulse signals are produced from Z/D terminals of the down-counter 241 and 242.

When the signal S(241) is produced from the down-counter 241, the potential of the output signal S(243) from the flip-flop circuit 243 rises. Then, when signal S(242) is produced from the down-counter 242, the potential of the output signal S(243) from the flip-flop circuit 243 falls.

Figure 10A:
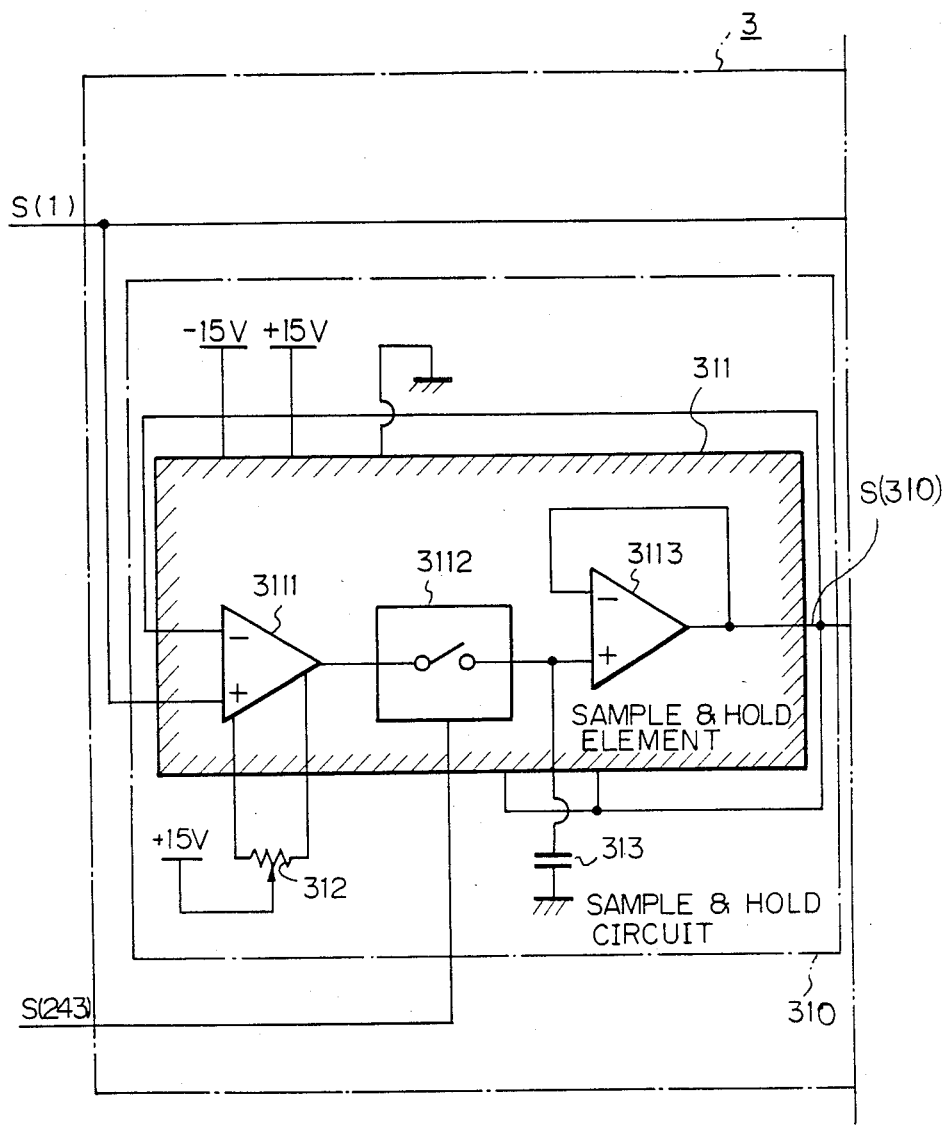
FIGS. 10 (including FIGS. 10A and 10B) and 11 illustrate the structure of the ignition/misfire decision unit used in the device shown in FIG. 8.
Figure 10B:
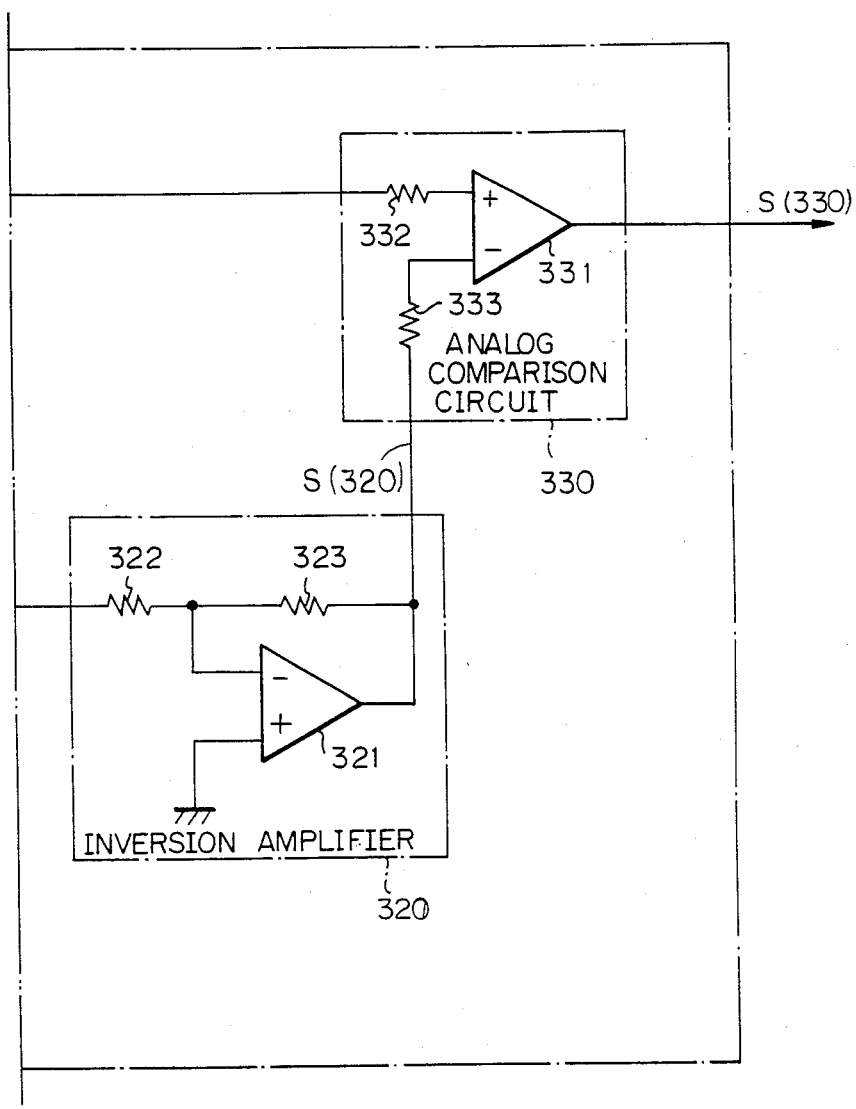
Figure 11:
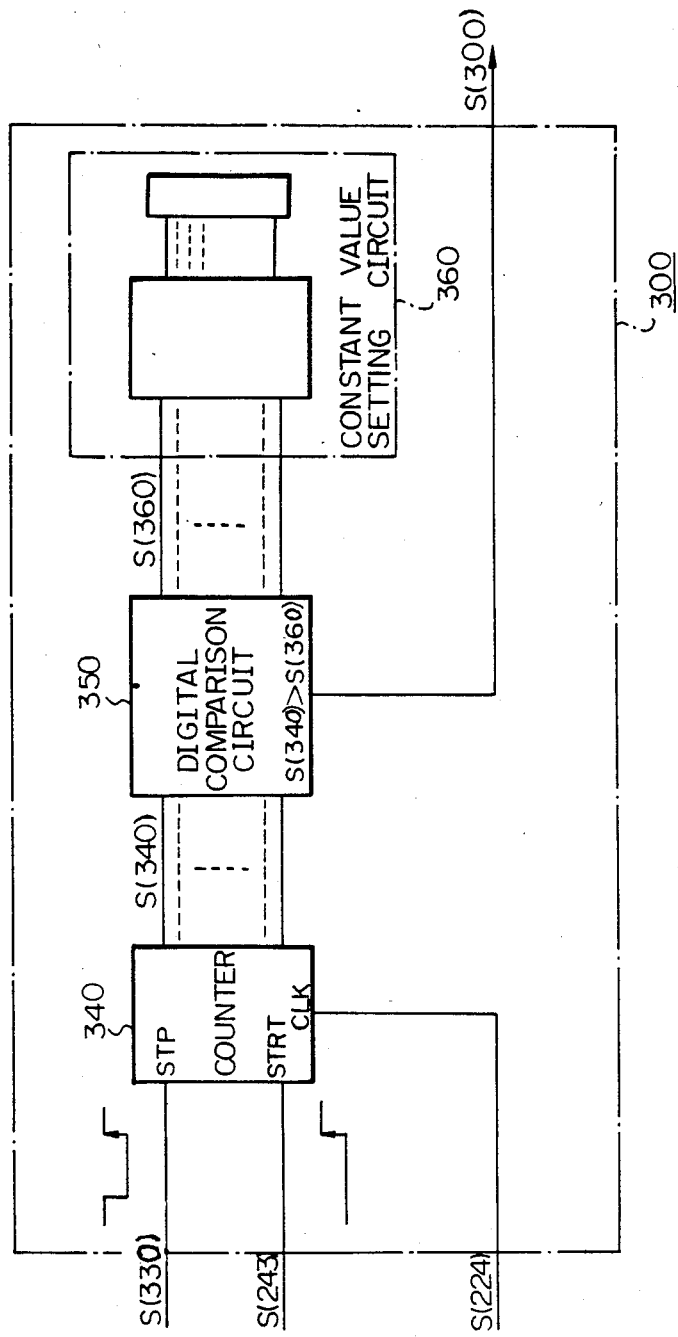

The structure of the ignition/misfire decision unit 300 in the device shown in FIG. 8 is illustrated in FIGS. 10 and 11. The ignition/misfire decision unit 300 includes a sample and hold circuit 310, an inversion amplifier circuit 320, an analog comparison circuit 330, a counting circuit 340, a digital comparison circuit 350, and a digital constant value setting circuit 360.

The sample and hold circuit 310, carries out the sample and hold operation for the output S(1) from the pressure detection unit 1, using a predetermined crankshaft angle timing of the output S(243) obtained from the timing detection unit 2. The output S(310) of the sample and hold circuit 310 is supplied to the inversion amplifier circuit 320, where the inverted outputs S(320) is produced. The analog comparison circuit 330, carries out the comparison between the output S(1) from the pressure detection unit and the output S(320) from the inversion amplifier circuit 320. The potential of the output S(330) of the analog comparison circuit 330 becomes HIGH when the output S(1) exceeds the output S(320).

The counting circuit 340 receives the signals S(330), S(243), and S(224). The counting of the counting circuit 340 is started at a rising of the potential of the output S(243) of the timing detection unit 2, using the output S(224) of the timing detection unit as clock signals. After that, the counting of the counting circuit 340 is terminated at a rising of the potential of the output S(330) of the analog comparison circuit 330.

The digital comparison circuit 350, carries out the comparison between the output S(340) from the counting circuit 340 and the output S(360) from the digital constant selection circuit 360.

When ignition takes place, the output S(340) is greater than the output S(360), and hence the potential of the output S(300) of the digital comparison circuit 350 becomes HIGH. The above-described operation is carried out for each rotation of the engine, and resetting also is carried out for each rotation of the engine.

Figure 12A:
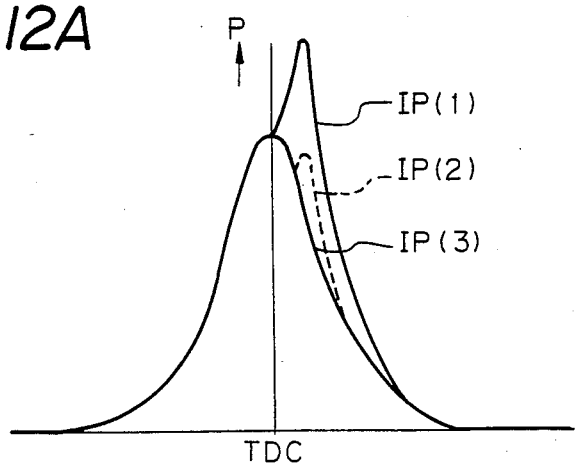
FIGS. 12A and 12B illustrate the principle of the decision concerning ignition/misfire in the device shown in FIG. 8.
Figure 12B:
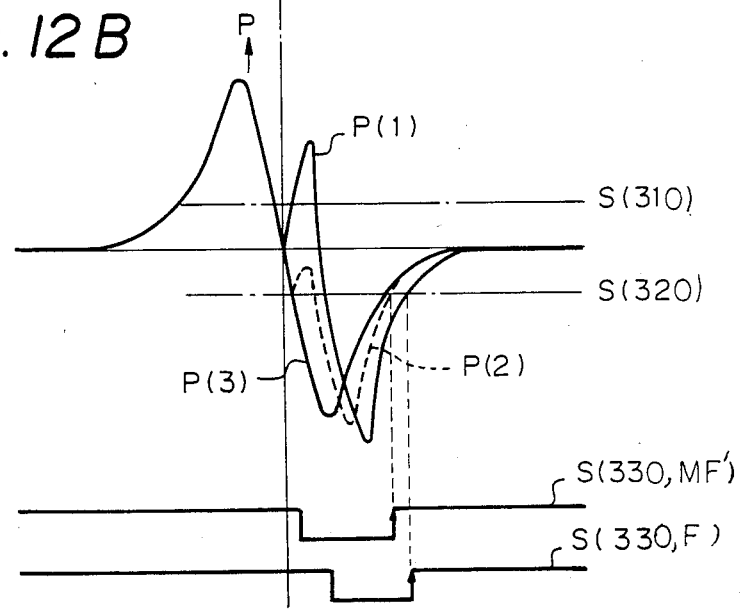

The principle of the decision concerning ignition/misfire in the device shown in FIG. 8 will now be described with reference to FIGS. 12A and 12B. In FIG. 12A, the abscissa represents time or crankshaft angle, while the ordinate represents the integrated output IP of the pressure detection unit 1. The curve IP(1) represents a complete ignition condition, i.e., an appropriate fuel injection carried out, IP(2) represents a condition just prior to misfire, and IP(3) represents a complete misfire condition. In FIG. 12B, the abscissa corresponds to that in FIG. 12A, while the ordinate represents the output P of the pressure detection unit 1. The curve P(1) represents the complete ignition condition (F), i.e., the appropriate fuel injection carried out, P(2) represents the condition (MF') just prior to misfire, and P(3) represents the complete misfire condition.

The upper chain line shown in FIG. 12B corresponds to the output S(310) of the sample and hold circuit 310, and the lower chain line corresponds to the output S(320) of the inversion amplifier circuit 320.

Shown at the bottom of FIG. 12B are the waveform of the signal S(330, MF') of the analog comparison circuit 330 i.e., the condition just prior to misfire, and the waveform of the signal S(330, F) of the analog comparison circuit 330, i.e., the complete ignition condition.

The counting of the counting circuit 340 is started by the output S(234) of the timing detection unit 2, using the signal S(224) from the timing detection unit 2. At the same time, the sample and hold operation for the output S(1) from the pressure detection unit 1 is carried out in the sample and hold circuit 310 to produce the output S(310), which is supplied to the inversion amplifier circuit 320 where the inversion amplification is carried out to produce the output S(320).

The analog comparison circuit 330, carries out the comparison between the output S(320) and the output S(1), to produce the output S(330). The counting of the counting circuit 340 is terminated at the change from LOW to HIGH of the potential of the output S(330) of the analog comparison circuit 330.

Thus, the decision concerning ignition/misfire is made from the result of the comparison in the digital comparison circuit 350 between the output S(340) of the counting circuit 340 and the output S(360) of the digital constant value setting circuit 360, where the constant value corresponding to the count for a misfire condition has been settled.

Figure 13:
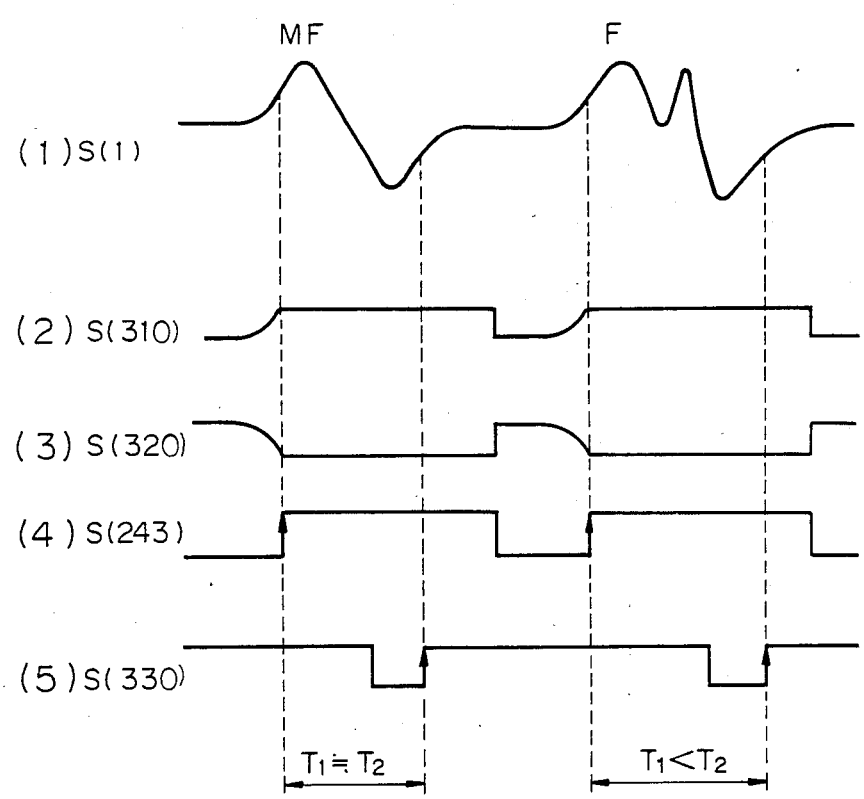
FIG. 13 illustrates the waveforms of the signals in the device shown in FIG. 8.

The waveforms of the signals S(1), S(310), S(320), S(243), and S(330), for a misfire MF and complete ignition F, in the device shown in FIG. 8 are illustrated in FIG. 13.

We claim:

1. A device for the detection of ignition/misfire in an internal combustion engine comprising:
    pressure detection means for detecting changes in the combustion pressure in said engine and producing an output indicative thereof,
    timing detection means for calculating a reference angular position of the rotation of said engine, and
    ignition/misfire decision means for deciding the occurrence of ignition/misfire of said engine, said ignition/misfire decision means comprising:
    (a) positive value comparison means for comparing said output of said pressure detection means with a pedetermined positive reference voltage,
    (b) negative value comparison means for comparing said output of said pressure detection means with a predetermined negative reference voltage,
    (c) first counting means for measuring the period from the generation of and output of said positive value comparison means to the generation of an output of said negative value comparison means and producing an output indicative of said measuring,
    (d) second counting means for measuring the period which is twice the period from the generation of said output of said positive value comparison means to the generation of an output reference signal from said timing detection means and producing an output indicative of said measuring, and
    (e) comparison means for comparing said output of said first counting means and said output of said second counting means.

2. A device according to claim 1, wherein said pressure detection means is of the piezoelectric type.

3. A device according to claim 2, wherein said piezoelectric pressure detection means comprises a housing, a diaphragm fixed to said housing for receiving pressure, a pressure receiving column connected to said diaphragm, a sensor body in said housing, and a piezoelectric element embraced by said sensor body, said piezoelectric element being arranged between said pressure receiving column and an output electrode.

4. A device for the detection of ignition/misfire in an internal combustion engine comprising:
    pressure detection means for detecting changes in the combustion pressure in said engine,
    timing detection means for calculating a reference angular position of rotation of said engine, and
    ignition/misfire decision means for deciding the occurrence of ignition/misfire of said engine,
    said ignition/misfire decision means comprising:
    sample and hold means for sampling and holding an output of said pressure detection means at a predetermined timing of the crankshaft angle according to an output of said timing detection means,
    inversion means for inverting an output of said sample and hold means with respect to a reference value,
    first comparison means for comparing said output of said pressure detection means with an output of said inversion means,
    counting means for starting counting at a predetermined timing of the crankshaft angle obtained from said timing detection means and terminating counting at the generation of an output of said first comparison means and producing an output indicative of said count, and
    constant value setting means for setting an output value corresponding to misfire of said engine, and
    second comparison means for comparing said output of said counting means with said output of said constant value setting means.

5. A device according to claim 4, wherein said pressure detection means is of the piezoelectric type.

6. A device according to claim 5, wherein said piezoelectic pressure detection means comprises a housing, a diaphragm fixed to said housing for receiving pressure, a pressure receiving column connected to said diaphragm, a sensor body in said housing, and a piezoelectric element embraced by said sensor body, said piezoelectric element being arranged between said pressure receiving column and an output electrode.

* * * * *